US009056366B2

(12) United States Patent
Rappl et al.

(10) Patent No.: US 9,056,366 B2
(45) Date of Patent: Jun. 16, 2015

(54) WELDING GAS LEAK DETECTION SYSTEM AND METHOD

(75) Inventors: James Francis Rappl, Neenah, WI (US); Thomas Don Lahti, Appleton, WI (US); Jeffery Ray Ihde, Greenville, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 501 days.

(21) Appl. No.: 13/088,778

(22) Filed: Apr. 18, 2011

(65) Prior Publication Data

US 2011/0284500 A1    Nov. 24, 2011

Related U.S. Application Data

(60) Provisional application No. 61/347,084, filed on May 21, 2010.

(51) Int. Cl.
  *B23K 9/16*    (2006.01)
  *B23K 9/10*    (2006.01)
  *F17D 5/06*    (2006.01)
  *G01M 3/28*    (2006.01)
(52) U.S. Cl.
  CPC .............. *B23K 9/1006* (2013.01); *B23K 9/164* (2013.01); *F17D 5/06* (2013.01); *G01M 3/2815* (2013.01)
(58) Field of Classification Search
  USPC .............. 219/74, 75, 54, 132, 121.55, 121.63
  See application file for complete search history.

(56) References Cited

U.S. PATENT DOCUMENTS

| 2001/0032830 A1* | 10/2001 | McCormick .............. 219/86.31 |
| 2004/0159144 A1* | 8/2004 | Abelen et al. .................. 73/49.3 |
| 2006/0213892 A1* | 9/2006 | Ott .................. 219/132 |
| 2008/0116185 A1* | 5/2008 | Luck et al. .................. 219/132 |

FOREIGN PATENT DOCUMENTS

| EP | 1847694 A2 | 8/2011 |
| WO | 02066195 A2 | 8/2002 |
| WO | 2007133091 A1 | 11/2007 |
| WO | 2008062205 A2 | 5/2008 |
| WO | 2009031902 A1 | 3/2009 |

OTHER PUBLICATIONS

International Search Report for application No. PCT/US2011/37471 mailed Aug. 19, 2011.

* cited by examiner

*Primary Examiner* — Brian Jennison
(74) *Attorney, Agent, or Firm* — Fletcher Yoder P.C.

(57) ABSTRACT

A method and system for detecting a welding gas leak is provided. One welding power supply includes a gas valve configured to control the flow of shielding gas to a welding device through a gas line. The welding power supply also includes a sensor coupled to the gas line and configured to detect a parameter of the shielding gas. The welding power supply includes control circuitry coupled to the gas valve and to the sensor, and configured to control the operation of the gas valve, and to receive device value representative of the detected parameter. The control circuitry is further configured to determine a leak test result based upon the parameter value, and to provide an operator indicator of the leak test result.

21 Claims, 5 Drawing Sheets

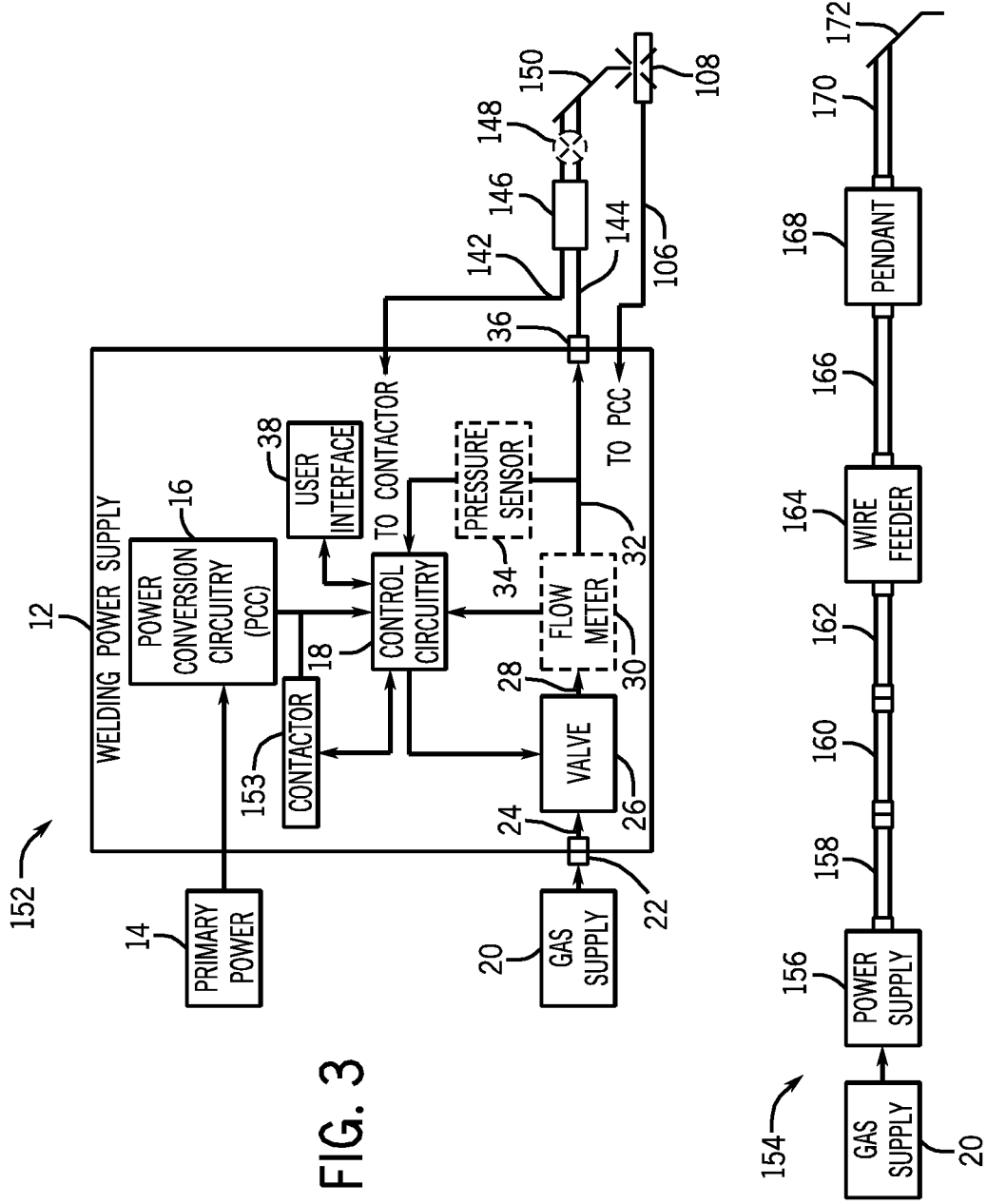

WELDING GAS LEAK DETECTION SYSTEM AND METHOD

CROSS REFERENCE TO RELATED APPLICATIONS

This application is a Non-Provisional Patent Application of U.S. Provisional Patent Application No. 61/347,084 entitled "Welding Shielding Gas Leak Detection", filed May 21, 2010, which is herein incorporated by reference.

BACKGROUND

The invention relates generally to welding systems and, more particularly, to a welding gas leak detection system and method.

Welding is a process that has increasingly become ubiquitous in various industries and applications. Such processes may be automated in certain contexts, although a large number of applications continue to exist for manual welding operations. In both cases, such welding operations rely on a variety of types of equipment to ensure the supply of welding consumables (e.g., wire feed, shielding gas, etc.) is provided to the weld in an appropriate amount at the desired time. For example, metal inert gas (MIG) welding typically relies on the integrity of shielding gas cables to enable a shielding gas to reach a welding torch.

In welding applications employing compressed gases, a gas supply is utilized to provide shielding gas that is conveyed through hoses or cables to a welding torch. Unfortunately, the gas hoses and cables or connections between them may develop leaks which cause the shielding gas to exit the welding system at an undesired location. Thus, shielding gas may be wasted and an insufficient quantity of shielding gas may reach the welding torch. Furthermore, environmental air may enter the gas cables and act as a contaminant that may adversely affect the weld.

There is a need in the field for techniques that might permit the detection of leaks that develop in welding gas lines both when commissioned as well as during use. There is a particular need for techniques that may allow for localization of detected leaks so that the systems may be appropriately serviced, components replaced, and so forth.

BRIEF DESCRIPTION

In an exemplary embodiment, a welding power supply includes a gas valve configured to control the flow of shielding gas to a welding device through a gas line. The welding power supply also includes a sensor coupled to the gas line and configured to detect a parameter of the shielding gas. The welding power supply includes control circuitry coupled to the gas valve and to the sensor, and configured to control the operation of the gas valve, and to receive a value representative of the detected parameter. The control circuitry is further configured to determine a leak test result based upon the parameter value, and to provide an operator indicator of the leak test result.

In another embodiment, a welding system includes a welding power supply having a gas valve, a first sensor, and control circuitry. The control circuitry is configured to control the gas valve to control the flow of shielding gas to a welding application through a gas line. The first sensor is coupled to the gas line and configured to detect a first parameter of the shielding gas. The welding system also includes a welding component coupled to the gas line between the first sensor and the welding application, and having a second sensor configured to detect a second parameter of the shielding gas. Monitoring circuitry configured to receive first and second values representative of the first and second parameters, to determine a leak test result based upon the parameter values, and to provide an operator indicator of the leak test result.

In another embodiment, a method for detecting a shielding gas leak in a welding system includes detecting first and second parameters of a shielding gas within the welding system and detecting a gas leak based upon values representative of the detected parameters.

In another embodiment, a welding system includes a welding power supply having control circuitry configured to control a gas valve to control the flow of shielding gas to a welding application through a gas line. The welding system also includes a sensor coupled to the gas line and configured to detect a parameter of the shielding gas. The welding system includes monitoring circuitry configured to receive a value representative of the parameter, to determine a leak test result based upon the parameter value, and to provide an operator indicator of the leak test result.

DRAWINGS

These and other features, aspects, and advantages of the present invention will become better understood when the following detailed description is read with reference to the accompanying drawings in which like characters represent like parts throughout the drawings, wherein:

FIG. 3 is a schematic diagram of another embodiment of a welding system employing a gas leak detection system;

FIG. 4 is a schematic diagram of a further embodiment of a welding system which may utilize a gas leak detection system;

DETAILED DESCRIPTION

Figure 1:
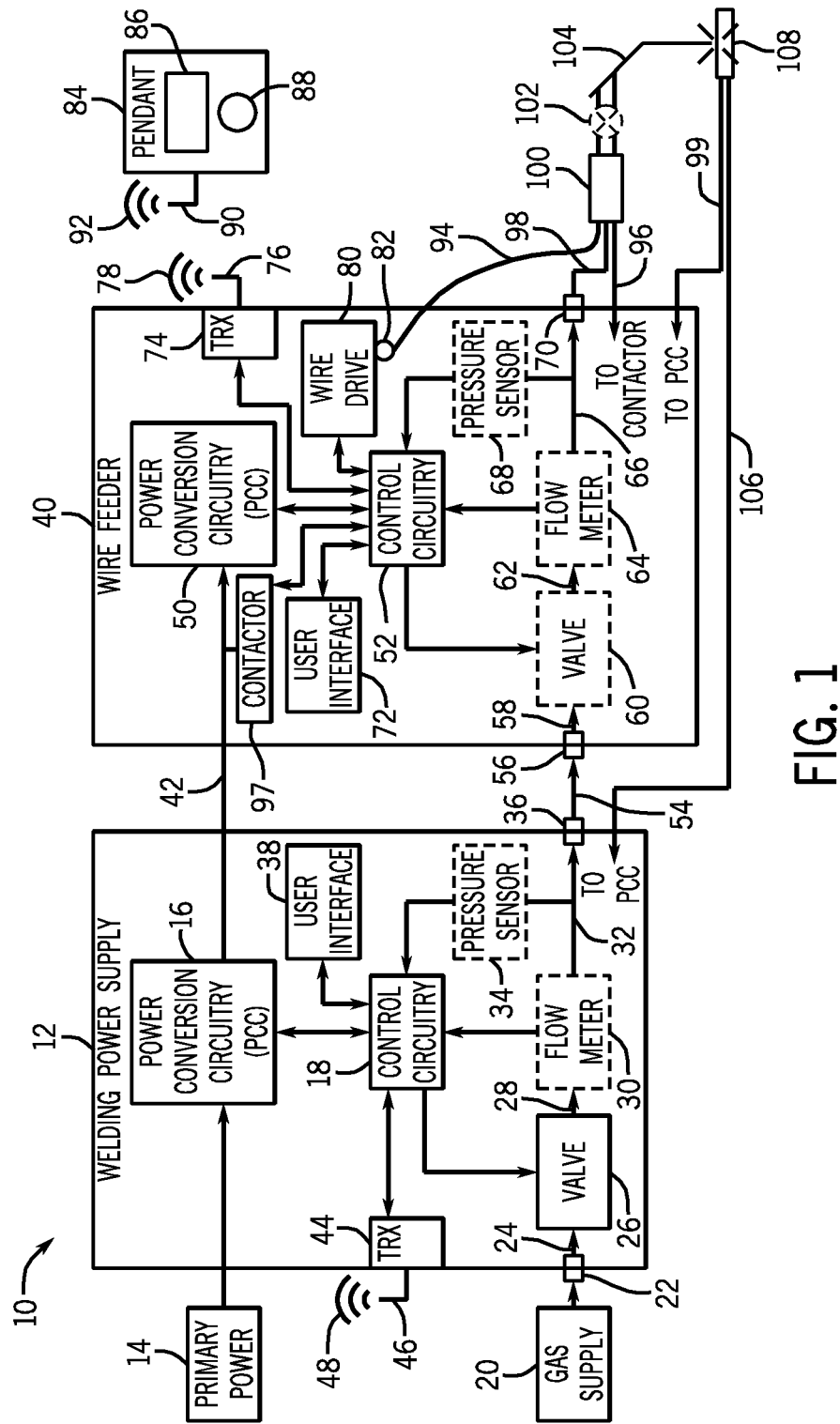
FIG. 1 is a schematic diagram of an embodiment of a welding system employing a gas leak detection system.

Turning now to the drawings, FIG. 1 is a schematic diagram of an embodiment of a welding system 10 with a gas leak detection system. In the illustrated embodiment, the welding system is a MIG welding system, although the present techniques may be used on other welding systems utilizing compressed gases, such as tungsten inert gas (TIG) systems, and so forth. The welding system 10 powers, controls, and supplies consumables to a welding application. The welding system 10 includes a welding power supply 12.

The welding power supply 12 receives primary power 14 (e.g., from the AC power grid, an engine/generator set, a battery, or other energy generating or storage devices, or a combination thereof), conditions the primary power, and provides an output power to one or more welding devices in accordance with demands of the system 10. The primary power 14 may be supplied from an offsite location (i.e., the primary power may originate from the power grid). Accordingly, the welding power supply 12 includes power conversion circuitry 16 that may include circuit elements such as transformers, rectifiers, switches, and so forth, capable of converting the AC input power to AC or DC output power as dictated by the demands of the system 10 (e.g., particular welding processes and regimes). Such circuits are generally known in the art.

In some embodiments, the power conversion circuitry 16 may be configured to convert the primary power 14 to both weld and auxiliary power outputs. However, in other embodiments, the power conversion circuitry (PCC) 16 may be adapted to convert primary power only to a weld power output, and a separate auxiliary converter may be provided to convert primary power to auxiliary power. Still further, in some embodiments, the welding power supply 12 may be adapted to receive a converted auxiliary power output directly from a wall outlet. Indeed, any suitable power conversion system or mechanism may be employed by the welding power supply 12 to generate and supply both weld and auxiliary power.

The welding power supply 12 includes control circuitry 18. The control circuitry 18 includes at least one controller that controls the operations of the welding power supply 12, and may be configured to receive and process a plurality of inputs regarding the performance and demands of the system 10. Furthermore, the control circuitry 18 may include volatile or non-volatile memory, such as ROM, RAM, magnetic storage memory, optical storage memory, or a combination thereof. In addition, a variety of control regimes for various welding processes, along with associated settings and parameters may be stored in the memory along with code configured to provide a specific output (e.g., initiate wire feed, enable gas flow, etc.) during operation.

A gas supply 20 provides shielding gases, such as argon, helium, carbon dioxide, and so forth, depending upon the welding application. The gas flows through an inlet 22 of the welding power supply 12, through a hose 24, and enters a valve 26 (e.g., through an inlet). The valve 26 controls the flow of gas, and if desired, may be selected to allow for modulating or regulating the amount of gas supplied to a welding operation. The valve 26 may be opened, closed, or otherwise operated by the control circuitry 18 to enable, inhibit, or control gas flow through the valve 26. For example, when the valve 26 is closed, shielding gas may be inhibited from flowing through the valve 26. Conversely, when the valve 26 is opened, shielding gas is enabled to flow through the valve 26.

Shielding gas exits the valve 26 (e.g., through an outlet) and flows through a hose 28 (or cable, which in some implementations may be packaged with the welding power output). In general, as discussed below, the gas valve, the hose, and any conduits and flow components between the gas supply (typically a tank) and the welding application form a "gas line" that may develop leaks, which may be detected in accordance with the present techniques.

One or more sensors are connected to the gas line, and detect parameters of the gas. Based upon these parameters, a monitoring circuit, which may be part of the control circuitry, determines whether there is a leak in the gas line. For example, in the embodiment illustrated in FIG. 1, the hose 28 may couple the valve 26 to a flow meter 30. The flow meter 30 measures the quantity of shielding gas that flows through the flow meter 30. As such, the flow meter 30 may be any type of flow measuring device. For example, the flow meter 30 may be a thermal mass flow meter, mass flow meter, mass flow controller, or another type of flow meter. The flow meter 30 outputs a flow measurement (a value representative of gas flow) to the control circuitry 18 (or any other monitoring circuit). The flow measurement indicates the amount of shielding gas flowing through the flow meter 30. In certain embodiments, the valve 26 may include the functionality of a valve and a flow meter, such as via a mass flow controller.

Shielding gas flows from the flow meter 30 through hose 32. A pressure sensor 34 may be coupled to the hose 32 to measure the pressure of the shielding gas in the hose 32. The pressure sensor 34 outputs a pressure measurement (a value representative of gas pressure) to the control circuitry 18 (or any other monitoring circuit). Such a pressure sensor 34 may be any type of pressure measuring device. For example, the pressure sensor 34 may be a pressure transducer, pressure transmitter, pressure indicator, piezometer, manometer, or any other pressure sensing device. The shielding gas flows through the hose 32 where the pressure sensor 34 measures the pressure of the shielding gas. Shielding gas exits the welding power supply 12 through an outlet 36.

It should be noted that the techniques described herein for determining whether a gas leak has occurred (or is ongoing) may be based upon any suitable parameter, with pressure and flow being two presently contemplated parameters. In practice, one or both of these may be used. In the case of detected flows, it may be determined that some flow is ongoing when no welding operation has been initiated, indicating that gas is exiting the gas line when no flow should be expected. In the case of pressures, it may be determined that an anticipated static pressure is seen to decline over some monitoring time horizon, also indicating a gas leak. In some embodiments, more complex arrangements may incorporate more than one flow sensor, and/or more than one pressure sensor, allowing for more complex leak detection and isolation. Similarly, where signals are detected near a source, this may allow for systematically disconnecting components from the gas line to identify which component is leaking.

The welding power supply 12 includes a user interface 38. The control circuitry 18 may receive input from the user interface 38 through which a user may choose a process, and input desired parameters (e.g., voltages, currents, particular pulsed or non-pulsed welding regimes, and so forth). Furthermore, the control circuitry 18 may control parameters input by the user as well as any other parameters. Specifically, the user interface 38 may include a display for presenting, or indicating, information to an operator, such as a measurement value or a test result that corresponds to a measurement made from a measuring device (e.g., flow meter, pressure sensor).

The welding system 10 includes a wire feeder 40 for providing wire for a welding operation. The wire feeder 40 receives welding and/or auxiliary power through a cable 42 connecting the wire feeder 40 to the welding power supply 12. In some embodiments, data may be communicated over the power cable 42. Data may also be communicated between the welding power supply 12 and the wire feeder 40 using wireless communication. A transceiver 44 is coupled to the control circuitry 18 in the welding power supply 12. The transceiver 44 includes an antenna 46 to send and receives signals 48 which may include measurement data (e.g., pressure sensor data, flow meter data).

The wire feeder 40 includes power conversion circuitry (PCC) 50 for providing power to portions of the wire feeder 40, such as to control circuitry 52. The control circuitry 52 controls the operations of the wire feeder 40. Shielding gas flows to the wire feeder 40 by flowing through hose 54 and entering the wire feeder 40 through an inlet 56. A first end of the hose 54 is connected to the outlet 36 of the welding power supply 12, while a second end of the hose 54 is connected to the inlet 56 of the wire feeder 40. The shielding gas flows through a hose 58 and may enter a valve 60 (e.g., through an inlet). Much like the valve 26 described above in relation to the welding power supply 12, the valve 60 controls the flow of gas through the wire feeder 40 to be supplied to a welding operation. Shielding gas exits the valve 60 (e.g., through an outlet) and flows through a hose 62.

The hose 62 may couple the valve 60 to a flow meter 64. The flow meter 64 measures the quantity of shielding gas that flows through the flow meter 64. Much like the flow meter 30 previously described, the flow meter 64 may be any type of flow measuring device. In addition, the flow meter 64 detects a flow parameter which indicates the amount of shielding gas flowing through the flow meter 64.

Shielding gas flows from the flow meter 64 through hose 66. A pressure sensor 68 may be coupled to the hose 66 to measure the pressure of the shielding gas in the hose 66. The pressure sensor 68 detects a pressure parameter and the control circuitry 52, or another monitoring circuitry, receives a value indicating the detected parameter. The shielding gas flows through the hose 66 where the pressure sensor 68 measures the pressure of the shielding gas and shielding gas exits the wire feeder 40 through an outlet 70. The wire feeder 40 includes a user interface 72. The control circuitry 52 may receive input from the user interface 72, such as via methods and devices described in relation to user interface 38. Furthermore, the control circuitry 52 may display information to an operator, such as a test result that corresponds to one or more parameters measured from a sensor (e.g., flow meter, pressure sensor).

As previously mentioned, data may be communicated between the welding power supply 12 and the wire feeder 40 using wireless communication. A transceiver 74 is coupled to the control circuitry 52 in the wire feeder 40. The transceiver 74 includes an antenna 76 to send and receives signals 78 to other welding devices in the welding system 10. The signals 78 may include measurement data (e.g., pressure sensor data, flow meter data). The wire feeder 40 includes a wire drive 80 that receives control signals from the control circuit 52 to drive rollers that pull wire off a wire spool 82.

The welding power supply 12 and/or the wire feeder 40 may communicate with a pendant 84. The pendant 84 includes a display 86 for presenting information to a welding operator, such as a measurement value, or a test result. The pendant 84 also includes a knob 88 or other input devices for an operator to control the operation of the pendant 84. In addition, the pendant 84 may communicate wirelessly with other welding devices in the welding system 10. Therefore, the pendant 84 includes an antenna 90 for transmitting wireless signals 92.

The wire feeder 40 provides wire 94 from the wire spool 82 for a welding operation. Likewise, the wire feeder 40 may provide welding power through a cable 96, and shielding gas through a hose 98. The wire 94, cable 96, and hose 98 may be bundled together with a connection device 100. A contactor 97 (e.g., high amperage relay) is coupled between the cable 96 and the cable 42 to enable or inhibit welding power current flow. In certain embodiments, the contactor 97 may be an electromechanical device, while in other embodiments the contactor 97 may be any other suitable device, such as a solid state device. In some embodiments, the cable 96 may be communicatively coupled to the control circuitry 52. Furthermore, a valve 102 may control the flow of shielding gas to a torch 104. The torch 104 uses the wire 94, welding power, and shielding gas for a welding operation. A work cable 106, which may be terminated with a clamp, couples the welding power supply 12 to a workpiece 108 to complete a welding power circuit. In other embodiments, the work cable 106 may be coupled to the wire feeder 40. As illustrated, a voltage sense lead 99 is coupled from the power conversion circuitry 50 to the workpiece 108, thus enabling current flow through the power conversion circuitry 50. In addition, in certain embodiments, the welding power may be provided directly from the welding power supply 12. The wire feeder 40 is configured as a voltage sensing wire feeder, however, in other embodiments the wire feeder 40 may be a control cable oriented wire feeder. While various hoses or cables have been described in the welding system, fewer or more hoses or cables may be used in place of the hoses described.

As may be appreciated, a gas leak may occur in the welding system 10 at any location where gas flows, that is, at any point in the gas line. For example, a gas leak may occur at inlets 22 and 56, outlet 36 and 70, and hoses 24, 28, 32, 54, 58, 62, 66, and 98. Using the welding system 10, a gas leak may be detected by a welding operator located at the torch 104. The torch 104 may be in a location remote from both the welding power supply 12 and the wire feeder 40. In such a case, the welding operator may use the pendant 84 to initiate the gas leak test. For example, the welding operator may select an option on the pendant 84 to initiate the gas leak test. The pendant 84 may wirelessly communicate the test details to the welding power supply 12 which conducts the gas leak test. In certain embodiments, the pendant 84 may be used to initiate and conduct the gas leak test. The gas leak test may be either a pressure test or a gas flow test. Both tests are explained in detail below in relation to FIGS. 5 and 6. The results of the test may be displayed to the welding operator on the display 86 of the pendant 84.

The torch 104 may also be located near the wire feeder 40. If this is the case, the welding operator may use the user interface 72 of the wire feeder 40 to initiate the gas leak test. For example, the welding operator may select an option on the wire feeder 40 to initiate the gas leak test. The wire feeder 40 may communicate the test details to the welding power supply 12 which conducts the gas leak test, or the wire feeder 40 may conduct the gas leak test. The results of the test may be displayed to the welding operator on the user interface 72 of the wire feeder 40. Furthermore, the gas leak test may be initiated at the welding power supply 12 and the results viewed via the user interface 38. In certain embodiments, gas leak tests on isolated portions of the welding system 10 may be performed simultaneously, or serially, to locate a gas leak. For example, a gas leak test may be performed between the valves 26 and 60 using pressure sensor 34, while at the same time a gas leak test may be performed between the valves 60 and 102 using pressure sensor 68. The gas leak test results may indicate a leak between valves 26 and 60, valves 60 and 102, or both.

Figure 2:
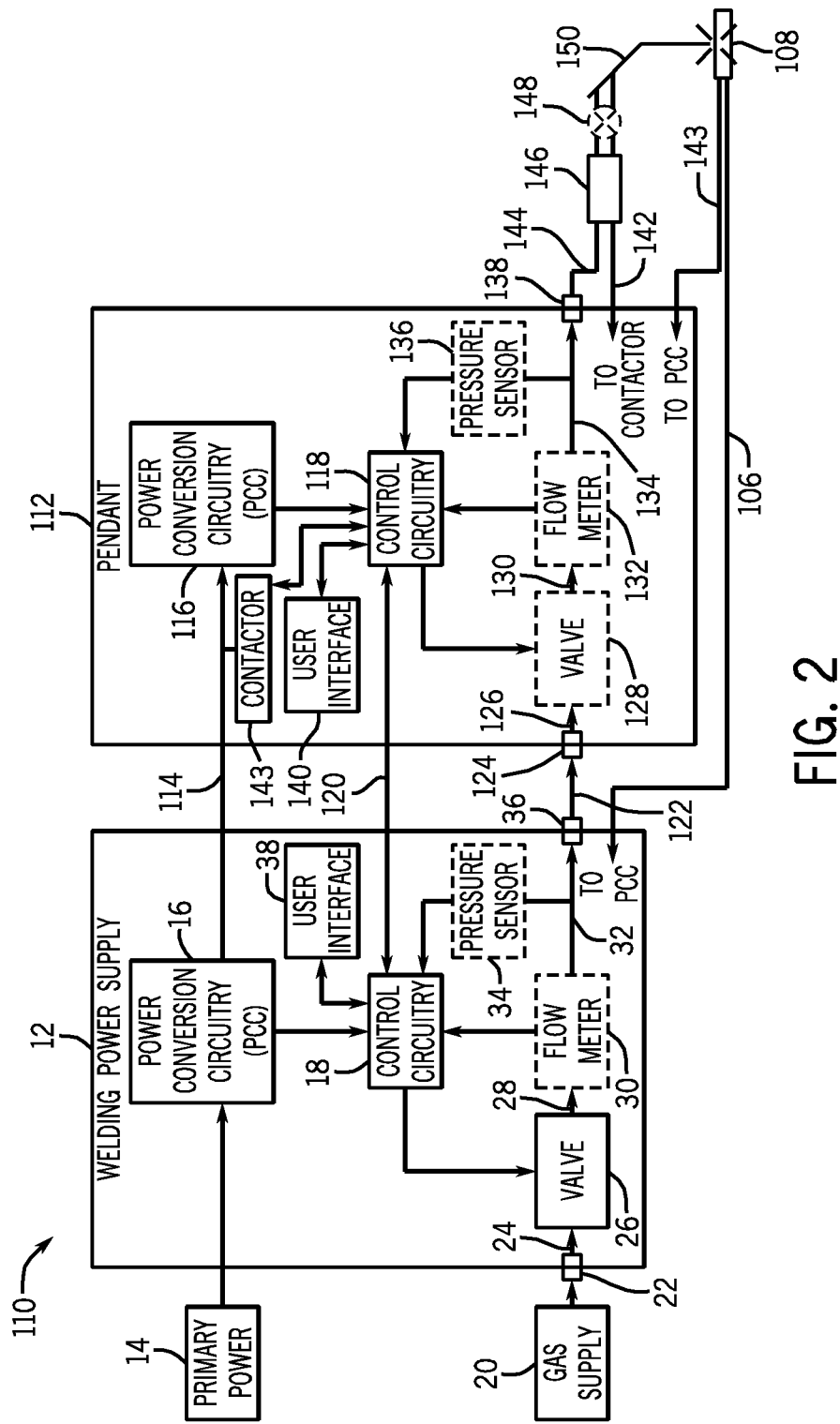
FIG. 2 is a schematic diagram of another embodiment of a welding system employing a gas leak detection system.

A welding system 110 may use direct communication between the welding power supply 12 and a pendant 112 as FIG. 2 illustrates. FIG. 2 is a schematic diagram of another embodiment of welding system 110 with a gas leak detection system (e.g., TIG welding system). The welding power supply 12 functions in a similar manner as described in FIG. 1. The welding system 110 includes the pendant 112 for communicating with the welding power supply 12 in order to control a welding operation. The pendant 112 receives welding and/or auxiliary power through a cable 114 connecting the pendant 112 to the welding power supply 12. In some embodiments, data may be communicated over the power cable 114.

The pendant 112 includes power conversion circuitry (PCC) 116 for providing operating power to the pendant 112, and devices in the pendant 112, such as control circuitry 118. The control circuitry 118 controls the operations of the pendant 112 and may communicate with the welding power supply 12 using a data cable 120. Shielding gas flows to the pendant 112 by flowing through hose 122 and entering the pendant 112 through an inlet 124. A first end of the hose 122 is connected to the outlet 36 of the welding power supply 12, while a second end of the hose 122 is connected to the inlet 124 of the pendant 112. The shielding gas flows through a hose 126 and may enter a valve 128 (e.g., through an inlet). The valve 128 controls the flow of shielding gas through the pendant 112 to be supplied to a welding operation. The valve 128 may be opened, closed, or otherwise operated by the control circuitry 118 to enable, inhibit, or control gas flow through the valve 128. Shielding gas exits the valve 128 (e.g., through an outlet) and flows through a hose 130.

The hose 130 may couple the valve 128 to a flow meter 132 to measure a flow parameter. As such, the flow meter 132 may be any type of flow measuring device. Shielding gas flows from the flow meter 132 through hose 134. A pressure sensor 136 may be coupled to the hose 134 to measure the pressure parameter of the shielding gas in the hose 134. As previously described with other pressure sensors, the control circuitry 118, or a monitoring circuitry may monitor the pressure parameter. The shielding gas flows through the hose 134 where the pressure sensor 136 measures the pressure of the shielding gas. Shielding gas exits the pendant 112 through an outlet 138. The pendant 112 also includes a user interface 140 from which the control circuitry 118 may receive input display test results.

The pendant 112 provides welding power through a cable 142 and shielding gas through a hose 144. The cable 142 and hose 144 may be bundled together with a connection device 146. A contactor 143 (e.g., high amperage relay) is coupled between the cable 142 and the cable 114 to enable or inhibit welding power current flow. In some embodiments, the cable 142 may be communicatively coupled to the control circuitry 118. Furthermore, a valve 148 may control the flow of shielding gas to a torch 150. The torch 150 uses the welding power and shielding gas for a welding operation. The work cable 106, which may be terminated with a clamp, couples the welding power supply 12 to the workpiece 108 to complete the welding power circuit. In other embodiments, the work cable 106 may be coupled to the pendant 112. As illustrated, a voltage sense lead 143 is coupled from the power conversion circuitry 116 to the workpiece 108, thus enabling current flow through the power conversion circuitry 116. In addition, in certain embodiments, the welding power may be provided directly from the welding power supply 12. Although the welding system 110 is illustrated with the torch 150, in certain embodiments the welding system 110 may not include the torch 150 attached to the pendant 112. For example, in such embodiments the torch 150 may be coupled directly to the welding power supply 12.

As may be appreciated, a gas leak may occur in the welding system 110 at any location where gas flows (i.e., the gas line). A gas leak may be detected by a welding operator located at the torch 150. Furthermore, a gas leak test may be initiated and/or performed by either the pendant 112 or the power supply 12. As previously described, the gas leak test may be either a pressure test or a gas flow test. Both tests are explained in detail below in relation to FIGS. 5 and 6. The results of the test may be displayed to the welding operator on the user interface 140 of the pendant 112, and/or the user interface 38 of the welding power supply 12.

A welding system 152 may have a welding torch directly connected to a welding power supply 12 as FIG. 3 illustrates. FIG. 3 is a schematic diagram of another embodiment of welding system 152 with a gas leak detection system (e.g., TIG welding system). The welding power supply 12 functions in a similar manner as described in FIG. 1. The welding power supply 12 provides welding power through the cable 142 and shielding gas through the hose 144. The hose 144 has a first end that connects to the output 36 and a second end that connects to the torch 150. The cable 142 and hose 144 may be bundled together with the connection device 146. A contactor 153 (e.g., high amperage relay) is coupled between the cable 142 and the power conversion circuitry 16 to enable or inhibit welding power current flow. In some embodiments, the cable 142 may be communicatively coupled to the control circuitry 18. Furthermore, the valve 148 may control the flow of shielding gas to the torch 150. The torch 150 uses the welding power and shielding gas for a welding operation. The work cable 106, which may be terminated with a clamp, couples the welding power supply 12 to the workpiece 108 to complete the welding power circuit. As may be appreciated, a gas leak may occur in the welding system 152 at any location where gas flows (i.e., the gas line). A welding operator may initiate a gas leak test, and the results of the test may be displayed to the welding operator on the user interface 38.

To locate the specific device causing a detected gas leak, welding devices may be removed from the welding system. FIG. 4 is a schematic diagram of an embodiment of a welding system 154 which may utilize a gas leak detection system, illustrating various welding devices in the system. The welding system 154 includes a gas supply 20 coupled to a welding power supply 156. The welding system 154 also includes hoses 158, 160, and 162 coupled between the welding power supply 156 and a wire feeder 164. A hose 166 is coupled between the wire feeder 164 and a pendant 168. Furthermore, a hose 170 is coupled between the pendant 168 and a torch 172. The torch 172 includes a valve; however, in certain embodiments the torch 172 may not include a valve. In such embodiments, the troubleshooting steps described below may be varied. As may be appreciated, fewer or more hoses may be coupled between the welding power supply 156, the wire feeder 164, the pendant 168, and the torch 172.

The results from a gas leak test, such as a pressure test using pressure sensors, may indicate that there is a gas leak in the system 154. If there is a gas leak in the system 154, the leak may exist anywhere in the welding system 154 that gas flows (i.e., anywhere between the gas supply 20 to the torch 172). To locate the specific welding device that is causing the gas leak, welding devices are removed from the system and the gas leak test is repeated. Specifically, the torch 172 may be removed if a gas leak is detected, then the gas leak test may be repeated a second time. If the second test result indicates that a gas leak no longer exists, the gas leak is likely caused by the torch 172 or the connection between the torch 172 and the hose 170. However, if the second test result indicates a gas leak still exits, the hose 170 may be removed from the system 154, and the gas leak test repeated a third time.

When the test is repeated, if the third test result indicates that a gas leak no longer exists, the gas leak is likely caused by the hose 170 or the connection between the hose 170 and the pendant 168. However, if the third test result indicates a gas leak still exits, the pendant 168 may be removed from the system 154, and the gas leak test repeated a fourth time. When the test is repeated, if the test result indicates that a gas leak no longer exists, the gas leak is likely caused by the pendant 168 or the connection between the hose 166 and the pendant 168. However, if the fourth test result indicates a gas leak still exits, the hose 166 may be removed from the system 154, and the gas leak test repeated a fifth time. This same pattern can be used through all devices in the system 154 until the gas leak location is tied to a particular device.

It should be noted that each device may include a gas inhibitor to inhibit gas flow when the device is not being used in a welding operation, or when the device is disconnected from another device. For example, the welding torch 172 may inhibit gas flow through the torch 172 when the torch is not being used. As another example, when hose 170 is disconnected from the pendant 168, the outlet of the pendant 168 may inhibit gas flow through the outlet. As a further example, when hose 166 is disconnected from the pendant 168, the hose 166 may inhibit gas from exiting the hose 166.

Figure 5:
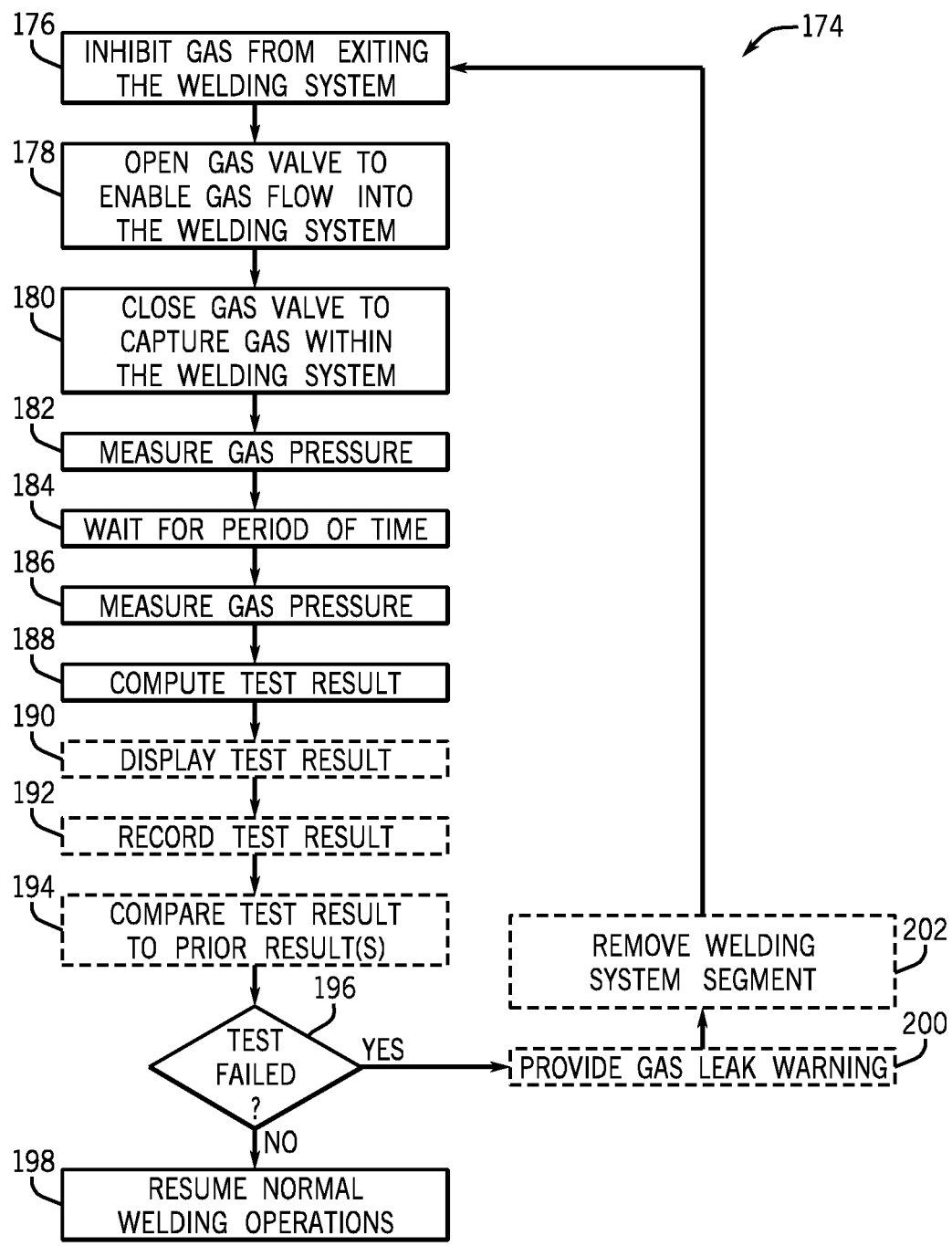
FIG. 5 is a flow chart of an embodiment of a method for detecting a gas leak in a welding system.

The gas leak test may be a pressure based test. FIG. 5 is a flow chart of an embodiment of a method 174 for detecting a gas leak in a welding system using a pressure test. At step 176, shielding gas is inhibited from exiting the welding system. This may be accomplished by stopping a welding operation and may include closing a valve located near the welding torch. Furthermore, a suspect segment of the welding system could be isolated, such as by closing a valve in a wire feeder or pendant in order to check for leaks between the welding power supply and the wire feeder or pendant.

Next, at step 178, a gas valve (or valves), such as the gas valve in the welding power supply, is opened to enable gas to flow into the welding system. If the gas valve is already opened, this step may not need to be performed. With the gas valve opened, gas will flow into the welding system and become pressurized. When the system is pressurized, the gas valve (or valves) is closed to inhibit gas flow into the welding system, at step 180. Following this, at step 182, the gas pressure is measured, such as with a pressure sensor, in order to get an initial pressure measurement. Then, at step 184, the test waits for a period of time, such as 5 seconds. However, the test may wait for any period of time. After waiting for a period of time, the gas pressure is measured again, at step 186. In certain embodiments, the gas pressure may be measured or monitored continuously.

When at least two measurements, separated by a period of time, have been measured, the welding system calculates a test result, at step 188. For example, the test result may be calculated by dividing the second pressure measurement by the first pressure measurement to get a percent of pressure remaining in the system relative to the initial measured pressure. Therefore, the test result may be a percentage ranging from 0 to 100 percent. Next, at step 190, the test result may be displayed via the user interface on the welding power supply, the pendant, and/or the wire feeder. Furthermore, the welding system may record the test results, at step 192.

Next, at step 194, the current test result may be compared to a prior test result or prior test results. This comparison may use an algorithm to determine whether or not the current test results show that a gas leak may be present in the system. At step 196, it is determined whether the system passed or failed the gas leak test. If the gas leak test did not fail, then, at step 198, the welding operator may resume normal welding operations. However, if the gas leak test did fail, at step 200, the welding system may provide the welding operator with a warning that there is a gas leak in the system. Furthermore, in certain embodiments, the gas leak test may result in an error state which causes the welding system to inhibit welding operations if a gas leak is detected. The welding system may be inhibited from performing welds until the system passes the gas leak test. A welding operator may, at step 202, remove a welding system device and repeat the gas leak test by repeating the method from step 176.

Figure 6:
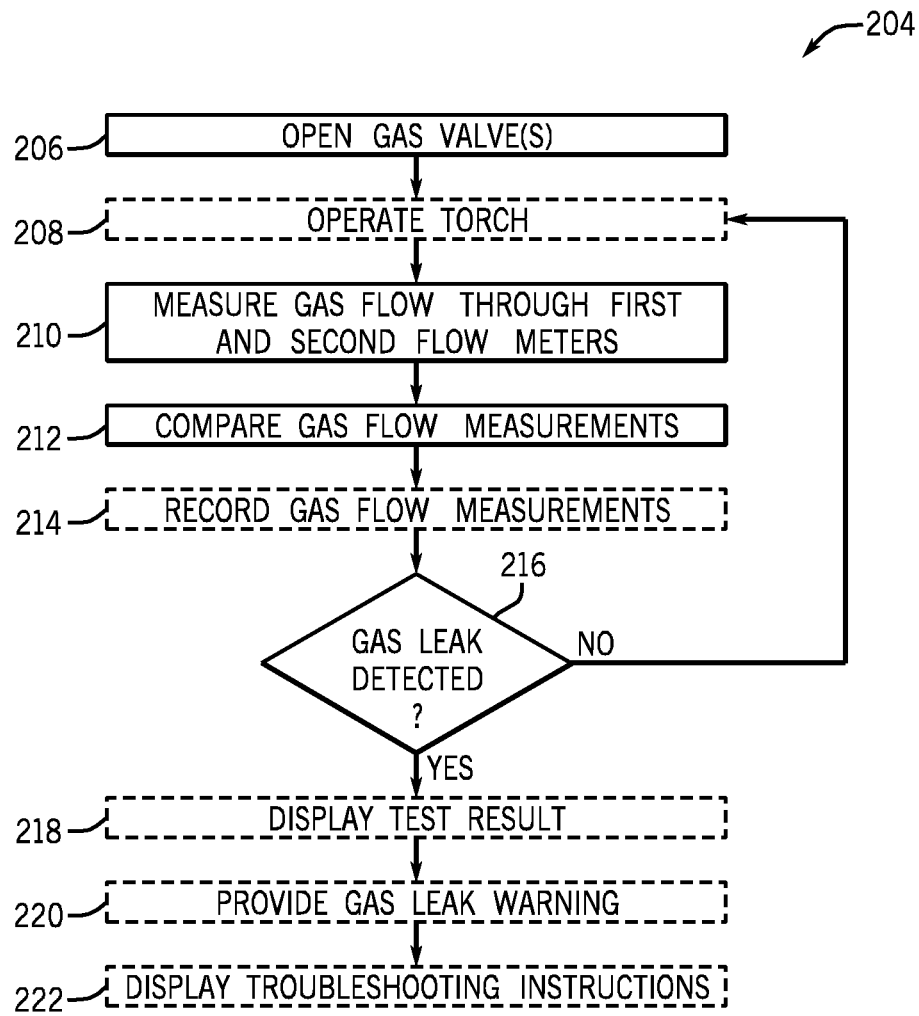
FIG. 6 is a flow chart of another embodiment of a method for detecting a gas leak in a welding system.

The gas leak test may also be a gas flow based test. FIG. 6 is a flow chart of an embodiment of a method 204 for detecting a gas leak in a welding system using a gas flow test. At step 206, gas valves, such as the gas valves in the welding power supply, wire feeder, pendant, and torch, are opened to enable gas to flow into the welding system. If the gas valves are already opened, this step may not need to be performed. With the gas valves opened, gas will flow into the welding system and become pressurized. Next, at step 208, the torch is operated, such as during a welding operation. When the torch is operated, gas will flow through a first and second flow meter. Then, at step 210, the flow meters will measure gas flowing through the flow meters.

At step 212, the welding system compares the gas flow measurements from the first and second flow meters. If there is a gas leak in the system, a flow meter closer to the gas supply may show a greater flow than a flow meter further from the gas supply. Therefore, the gas flow measurements may be compared by creating a ratio of a first measurement divided by a second measurement. In such a case, the first measurement is taken from a flow meter further from the gas supply than the second measurement so the ratio created by the measurements will be less than one. This ratio can provide a percentage of gas flowing through the welding system, such a percentage between 0 and 100 percent.

Next, at step 214, the welding system may record the gas flow measurements. Then, at step 216, if a gas leak is not detected, no change in the system will occur, and the welding operator may continue to operate the torch by returning in the method to step 208. If a gas leak is detected, a gas leak test result may be displayed, per step 218. Next, at step 220, the welding system may provide a warning to the welding operator that there is a gas leak in the system. In certain embodiments, the gas leak test may result in an error state which causes the welding system to inhibit welding operations if a gas leak is detected. The welding system may be inhibited from performing welds until the system passes the gas leak test. Furthermore, at step 222, the welding system may display troubleshooting instructions to the welding operator. The warning and/or troubleshooting instructions may be displayed via the user interface of the power supply, wire feeder, pendant, and/or another welding device.

As may be appreciated, the steps described in FIGS. 5 and 6 may be performed through manual controls, such as with the user interface of the welding power supply, the wire feeder, or the pendant, or these steps may be performed as part of an automatic function performed when requested by a welding operator. Further, these steps may be performed automatically by the welding system when a welding operator is welding or stops welding. For example, the welding power supply may automatically perform these steps one time per day.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A welding power supply comprising:
  a gas valve configured to control the flow of shielding gas to a welding device through a gas line;
  a sensor coupled to the gas line and configured to detect a parameter of the shielding gas;
  control circuitry coupled to the gas valve and to the sensor, and configured to control the operation of the gas valve, to receive a parameter value representative of the detected parameter, to determine a leak test result based upon the parameter value even when no welding operation is initiated at the welding device, and to provide an operator indicator of the leak test result; and
  a user interface coupled to the control circuitry and configured to display the leak test result.

2. The power supply of claim 1, comprising a wireless transceiver coupled to the control circuitry and configured to enable wireless communication between the power supply and another welding device.

3. The power supply of claim 1, wherein the sensor comprises a pressure sensor coupled to the gas line and configured to detect a pressure parameter of the shielding gas.

4. The power supply of claim 3, wherein the pressure sensor comprises a pressure transducer.

5. The power supply of claim 1, wherein the sensor comprises a flow meter coupled to the gas line and configured to detect a flow parameter of the shielding gas.

6. A welding system comprising:
a welding power supply having a gas valve, a first sensor, and control circuitry, the control circuitry configured to control the gas valve to control the flow of shielding gas to a welding application through a gas line, the first sensor coupled to the gas line and configured to detect a first parameter of the shielding gas;
a welding component coupled to the gas line between the first sensor and the welding application and comprising a second sensor configured to detect a second parameter of the shielding gas;
monitoring circuitry configured to receive first and second values representative of the first and second parameters, to determine a leak test result based upon the first and second values, and to provide an operator indicator of the leak test result; and
a user interface configured to provide the operator indicator of the leak test result to an operator of the welding system.

7. The system of claim 6, wherein the welding component comprises a wire feeder coupled to the gas line.

8. The system of claim 7, wherein the first sensor comprises a first flow meter configured to detect a first flow parameter of the shielding gas and the second sensor comprises a second flow meter configured to detect a second flow parameter of the shielding gas.

9. The system of claim 7, wherein the first sensor comprises a first pressure sensor configured to detect a first pressure parameter of the shielding gas and the second sensor comprises a second pressure sensor configured to detect a second pressure parameter of the shielding gas.

10. The system of claim 6, wherein the welding component comprises a pendant coupled to the gas line.

11. The system of claim 10, wherein the first sensor comprises a first flow meter configured to detect a first flow parameter of the shielding gas and the second sensor comprises a second flow meter configured to detect a second flow parameter of the shielding gas.

12. The system of claim 6, wherein the control circuitry comprises the monitoring circuitry.

13. The system of claim 6, wherein the welding component comprises a torch coupled to the gas line.

14. A welding system comprising:
a welding power supply having control circuitry configured to control a gas valve to control the flow of shielding gas to a welding application through a gas line;
a sensor coupled to the gas line and configured to detect a parameter of the shielding gas;
monitoring circuitry configured to receive a parameter value representative of the parameter, to determine a leak test result based upon the parameter value when the welding application is not initiated, and to provide an operator indicator of the leak test result; and
a user interface configured to provide the operator indicator of the leak test result to an operator of the welding system.

15. The system of claim 14, comprising a wire feeder, the monitoring circuitry disposed in the wire feeder.

16. The system of claim 14, comprising a wire feeder, the sensor disposed in the wire feeder.

17. The system of claim 14, comprising a pendant, the monitoring circuitry disposed in the pendant.

18. The system of claim 14, comprising a pendant, the sensor disposed in the pendant.

19. The system of claim 14, comprising a torch, the sensor disposed in the torch.

20. The system of claim 7, wherein the wire feeder comprises a gas valve, and the gas valve of the welding power supply and the gas valve of the wire feeder are configured to inhibit the flow of shielding gas within the welding system.

21. The system of claim 14, comprising a wire feeder having a gas valve, wherein the gas valve of the welding power supply and the gas valve of the wire feeder are configured to inhibit the flow of shielding gas within the welding system.

* * * * *